United States Patent
Grendon et al.

(10) Patent No.: US 11,610,186 B2
(45) Date of Patent: Mar. 21, 2023

(54) TRANSACTION CONTROL MANAGEMENT

(71) Applicant: MASTERCARD INTERNATIONAL INCORPORATED, Purchase, NY (US)

(72) Inventors: Lauren Grendon, Dublin (IE); Sheila Fernandez, Dublin (IE); Leire Hernandez-Gonzalez, Dublin (IE)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 293 days.

(21) Appl. No.: 15/680,476

(22) Filed: Aug. 18, 2017

(65) Prior Publication Data
US 2018/0053159 A1     Feb. 22, 2018

(30) Foreign Application Priority Data
Aug. 18, 2016   (EP) .................................. 16184816

(51) Int. Cl.
| | |
|---|---|
| *G06Q 20/10* | (2012.01) |
| *G06F 16/23* | (2019.01) |
| *G06Q 20/20* | (2012.01) |
| *G06Q 20/40* | (2012.01) |

(52) U.S. Cl.
CPC ......... *G06Q 20/10* (2013.01); *G06F 16/2365* (2019.01); *G06Q 20/202* (2013.01); *G06Q 20/405* (2013.01)

(58) Field of Classification Search
None
See application file for complete search history.

(56) References Cited

U.S. PATENT DOCUMENTS

| | | |
|---|---|---|
| 7,020,633 B2 | 3/2006 | Strayer et al. |
| 7,069,244 B2 | 6/2006 | Strayer et al. |
| 8,086,539 B2 | 12/2011 | Nauman et al. |
| 8,099,368 B2 | 1/2012 | Coulter et al. |

(Continued)

FOREIGN PATENT DOCUMENTS

WO   WO-2001/035242 A1 *   5/2001   .............. G06F 15/16

OTHER PUBLICATIONS

YARN-2: "Apache Hadoop YARN", unknown author, posted to Google Jan. 26, 2016.*

(Continued)

*Primary Examiner* — Abhishek Vyas
*Assistant Examiner* — Blane A Lickteig
(74) *Attorney, Agent, or Firm* — Armstrong Teasdale LLP

(57) ABSTRACT

A method of performing transaction processing operations at computing apparatus is provided, together with computing apparatus adapted to manage these operations. The computing apparatus includes a programmed processor adapted to provide the following functional elements. A agent manager node is adapted to install and deinstall transaction processing nodes. A transaction operation rules database holds transaction operation rules. An interface to a transaction processing infrastructure receives transaction data for the transaction processing operations. The transaction processing nodes are adapted to perform the transaction processing operation on the transaction data using the transaction operation rules under control of the agent manager node.

13 Claims, 6 Drawing Sheets

(56) References Cited

U.S. PATENT DOCUMENTS

| | | | |
|---|---|---|---|
| 8,577,804 B1 | 11/2013 | Bacastow | |
| 9,159,061 B2 | 10/2015 | Bacastow | |
| 9,361,611 B2 | 6/2016 | Bacastow | |
| 2006/0112379 A1 | 5/2006 | Chirakansakcharo et al. | |
| 2006/0212334 A1* | 9/2006 | Jackson | G06F 9/5027 709/226 |
| 2007/0043841 A1* | 2/2007 | Cannon | G06F 11/1451 709/223 |
| 2009/0177727 A1* | 7/2009 | Radia | G06F 9/5044 709/201 |
| 2010/0063903 A1* | 3/2010 | Whipple | G06Q 20/40 705/30 |
| 2011/0276531 A1* | 7/2011 | Bellamy, III | 706/47 |
| 2011/0238596 A1 | 9/2011 | Giordano et al. | |
| 2012/0030066 A1* | 2/2012 | Stringfellow | G06Q 30/00 705/26.41 |
| 2012/0131190 A1 | 5/2012 | Nauman et al. | |
| 2013/0013495 A1 | 1/2013 | Giordano et al. | |
| 2013/0036092 A1* | 2/2013 | Lafont | G06F 16/178 707/634 |
| 2013/0080328 A1* | 3/2013 | Royyuru | G06Q 40/02 705/44 |
| 2014/0114857 A1 | 4/2014 | Griggs et al. | |
| 2014/0201079 A1 | 7/2014 | Kavanagh et al. | |
| 2014/0358789 A1 | 12/2014 | Boding et al. | |
| 2015/0161599 A1 | 6/2015 | Sass et al. | |
| 2016/0147614 A1* | 5/2016 | Mittal | G06F 11/1451 707/615 |

OTHER PUBLICATIONS

YARN-1: "Apache Hadoop YARN: Yet Another Resource Negotiator" by Viinod Kumar Vavilapalli, et al. Copyright 2013 by the Association for Computing Machinery Inc. (ACM), Article No. 5 for the ACM 4th Annual Symposium on Cloud Computing, Oct. 1-3, 2013, Santa Clara, CA.*
"EPO Decision Aug. 28, 2020". European Patent Office. Aug. 8, 2020.*
"Apache Hadoop YARN". Google Search. Posted on Jan. 26, 2016.*
"Apache Hadoop YARN: Yet Another Resource Negotiator" by Viinod Kumar Vavilapalli, et al. Copyright 2013 by the Association for Computing Machinery Inc. (ACM), Article No. 5 for the ACM 4th Annual Symposium on Cloud Computing, Oct. 1-3, 2013, Santa Clara, CA.*
"EPO Decision Aug. 28, 2020". European Patent Office. Aug. 8, 2020 (Year: 2020).*
"Apache Hadoop YARN". Google Search. Posted on Jan. 26, 2016 (Year: 2016).*
"Apache Hadoop YARN: Yet Another Resource Negotiator" by Viinod Kumar Vavilapalli, et al. Copyright 2013 by the Association for Computing Machinery Inc. (ACM), Article No. 5 for the ACM 4th Annual Symposium on Cloud Computing, Oct. 1-3, 2013, Santa Clara, CA (Year: 2013).*
European Search Report for corresponding European U.S. Appl. No. 16/184,816, dated Feb. 16, 2017, 3 pages.
Verma Ankush et al., "Big data management processing with Hadoop MapReduce and spark technology: A comparison", 2016 Symposium On Colossal Data Analysis and Networking (Cdan), IEEE, Mar. 18, 2016.
Mnod Kumar Vavilapalli et al., "Apache Hadoop YARN: yet another Resource Negotiator", Proceedings of the 4TH Annual Symposium On Cloud Computing, Socc '13, New York, New York, USA, Jan. 1, 2013.
Raj R Sandeep et al., "An approach for optimization of resource management in Hadoop", International Conference On Computing and Communication Technologies, IEEE, Dec. 11, 2014.
Jens Krueger et al., "Main memory databases for enterprise applications", Industrial Engineering and Engineering Management (Ie &Em), 2011 IEEE 18TH International Conference On, IEEE, Sep. 3, 2011.
Bernstein David, "The Emerging Hadoop, Analytics, Stream Stack for Big Data", IEEE Cloud Computing, IEEE, USA, (20141101), vol. 1, No. 4, pp. 84-86.
Hormozi Elham et al., "Accuracy evaluation of a credit card fraud detection system on Hadoop MapReduce", The 5TH Conference On Information and Knowledge Technology, IEEE, May 28, 2013, pp. 35-39.
Matei Zaharia et al., "Resilient Distributed Datasets: A Fault-Tolerant Abstraction for In-Memory Cluster Computing", USENIX, Apr. 11, 2013, pp. 1-14.
"Amazon EC2 Secure and resizable compute capacity to support virtually any workload". Amazon Web Services, Inc. or its affiliates, 10 pages, accessed Feb. 22, 2021 at URL: https://aws.amazon.com/ec2/?ec2-whats-new.sort-by=item. additionalFields.postDateTime &ec2-whats-new.sort-order=desc.
"Amazon Elastic Compute Cloud". Wikipedia, 14 pages, accessed Feb. 22, 2021 at URL: https://en.wikipedia.org/wiki/Amazon_Elastic_Compute_Cloud.
"Scalability". Wikipedia, 6 pages, accessed Feb. 22, 2020 at URL: https://en.wikipedia.org/wiki/Scalability.
Byron Braswell et al.: "Enabling the On Demand Store with IBM Store Integration Framework", Chapters 2, 3, 5 (parts), 11 (parts), Feb. 1, 2007 (Feb. 1, 2007), pp. 1-78, XP055634668.
Ricardo Ferreira: "The Perfect Marriage: Oracle Business Rules & Coherence In-Memory Data Grid. High Scalable Business Rules with Extreme Low Latency", Ricardo Ferreira's Blog, Aug. 16, 2013 (Aug. 16, 2013), pp. 1-18, XP055636707.
European Office Action for EP 16184816.3, dated Jun. 11, 2019, 8 pages.
European Summons to Attend Oral Proceedings for EP 16184816.3, mailed Aug. 28, 2020, 9 pages.

* cited by examiner

TRANSACTION CONTROL MANAGEMENT

CROSS REFERENCE TO RELATED APPLICATIONS

This application claims the benefit of European Patent Application No. 16184816.3 filed Aug. 18, 2016, which is hereby incorporated by reference in its entirety.

BACKGROUND

This disclosure relates generally to transaction control management. In embodiments, this disclosure relates to an arrangement that provides locally scalable control management for a transaction system.

Payment cards such as credit cards and debit cards are very widely used for all forms of financial transaction. The use of payment cards has evolved significantly with technological developments over recent years. Many payments are made at a retail location, typically with a physical transaction card interacting with a point of sale (POS) terminal to perform a transaction. These transaction cards may interact with a POS by swiping through a magnetic stripe reader, or for a "chip card" or "smart card" by direct contact with a smart card reader (under standard ISO/IEC 7816) or by contactless interaction through local short range wireless communication (under standard ISO/IEC 14443).

The elements of a typical transaction system are shown in FIG. 1. To perform a transaction, a customer interacts with a merchant. A payment card 2 or other payment device such as a mobile phone 1 of the customer interacts with a point of sale terminal 3 of the retailer to perform a transaction. As will be discussed below, other transaction types are possible, such as an online transaction between a customer using a computing device and an internet-based merchant. Value is transferred between the customer's bank (the issuing bank or issuer 5) and the merchant's bank (the acquiring bank or acquirer 6). The transaction is passed to the acquirer 6 and the issuer 5 through a transaction infrastructure 7, this achieves the necessary switching to direct transaction information appropriately, and is also associated with one or more data centers 8 controlling and monitoring the transaction process on behalf of the transaction infrastructure provider. The transaction is authorized by the issuer 5, typically according to rules established by the transaction infrastructure provider.

Demand on a transaction infrastructure may be highly variable, but users of the system expect a high and consistent level of performance. This is challenging without provision of a level of computing resources appropriate to peak demand but excessive for normal or low demand. This can cause particular difficulty for processes associated with authorization by the issuer. It would therefore be desirable for computing resources to be matched to a current level of demand in transaction systems, particularly in relation to authorization processes. It would also be desirable for the transaction infrastructure provider to be able to support processes carried out local to the issuer effectively.

BRIEF DESCRIPTION

In a first aspect, the disclosure provides computing apparatus adapted to manage a transaction processing operation, the computing apparatus including a programmed processor adapted to provide the following: an agent manager node, wherein the agent manager node is adapted to install and uninstall transaction processing nodes, a transaction operation rules database including transaction operation rules, and an interface to a transaction processing infrastructure for receiving transaction data for the transaction processing operations, wherein the transaction processing nodes are adapted to perform the transaction processing operation on the transaction data using the transaction operation rules under control of the agent manager node.

In embodiments, the computing apparatus may further include an in-memory database containing transaction operation data from and for the transaction processing nodes. This may itself include the transaction operation rules database.

The agent manager node may be adapted for interaction with a master node of the transaction infrastructure, wherein the master node is physically separate apparatus, not local to the computing apparatus. One master node may interact with a number of agent manager nodes. In this case, the agent manager node may be adapted to receive control information from the master node. In cases where there is an in-memory database employed, this may be adapted to back up to a master in-memory database local to the master node. The computing apparatus may also be adapted to update the transaction operation rules in the transaction operation rules database from a master transaction operation rules database local to the master node.

The computing apparatus may act for a payment device issuing bank, in which case the transaction operation may be a transaction authorization. The transaction processing nodes may then also provide a payment device API for the issuing bank.

In a second aspect, the disclosure provides transaction infrastructure computing apparatus adapted to provide control of a system for performing transaction operations at one or more remote computing apparatus locations, the transaction infrastructure computing apparatus including a programmed processor adapted to provide the following: a master node adapted to interact with one or more agent manager nodes at remote computing apparatus locations each for controlling processing of a transaction operation at those remote computing apparatus locations, and a network connection allowing communication with said remote computing apparatus locations, wherein the master node provides control information to the agent manager nodes.

This transaction infrastructure computing apparatus may further include a master in-memory database, wherein the master in-memory database is adapted to back up in-memory databases local to the agent manager nodes. The transaction infrastructure computing apparatus may also include a master transaction operation rules database adapted to provide transaction operation rules updates to transaction operation rules databases local to the agent manager nodes.

In a third aspect, the disclosure provides a method of performing transaction operations at computing apparatus, the method including a agent manager node installing one or more transaction processing nodes, the agent manager node receiving transaction data from a transaction processing infrastructure for performance of a transaction operation and allocating the transaction operation to one of the transaction processing nodes, said transaction processing node performing the transaction operation on the transaction data using transaction operation rules in a local transaction operation rules database.

This method may further include receiving control information from a master node remote from the computing apparatus and providing transaction operation performance data to the master node.

In embodiments of this method, the computing apparatus acts for a payment device issuing bank, and the transaction operation is a transaction authorization.

BRIEF DESCRIPTION OF THE DRAWINGS

Embodiments of the disclosure will now be described, by way of example, with reference to the accompanying Figures, of which.

DETAILED DESCRIPTION

Specific embodiments of the disclosure will be described below with reference to the Figures.

Figure 1:
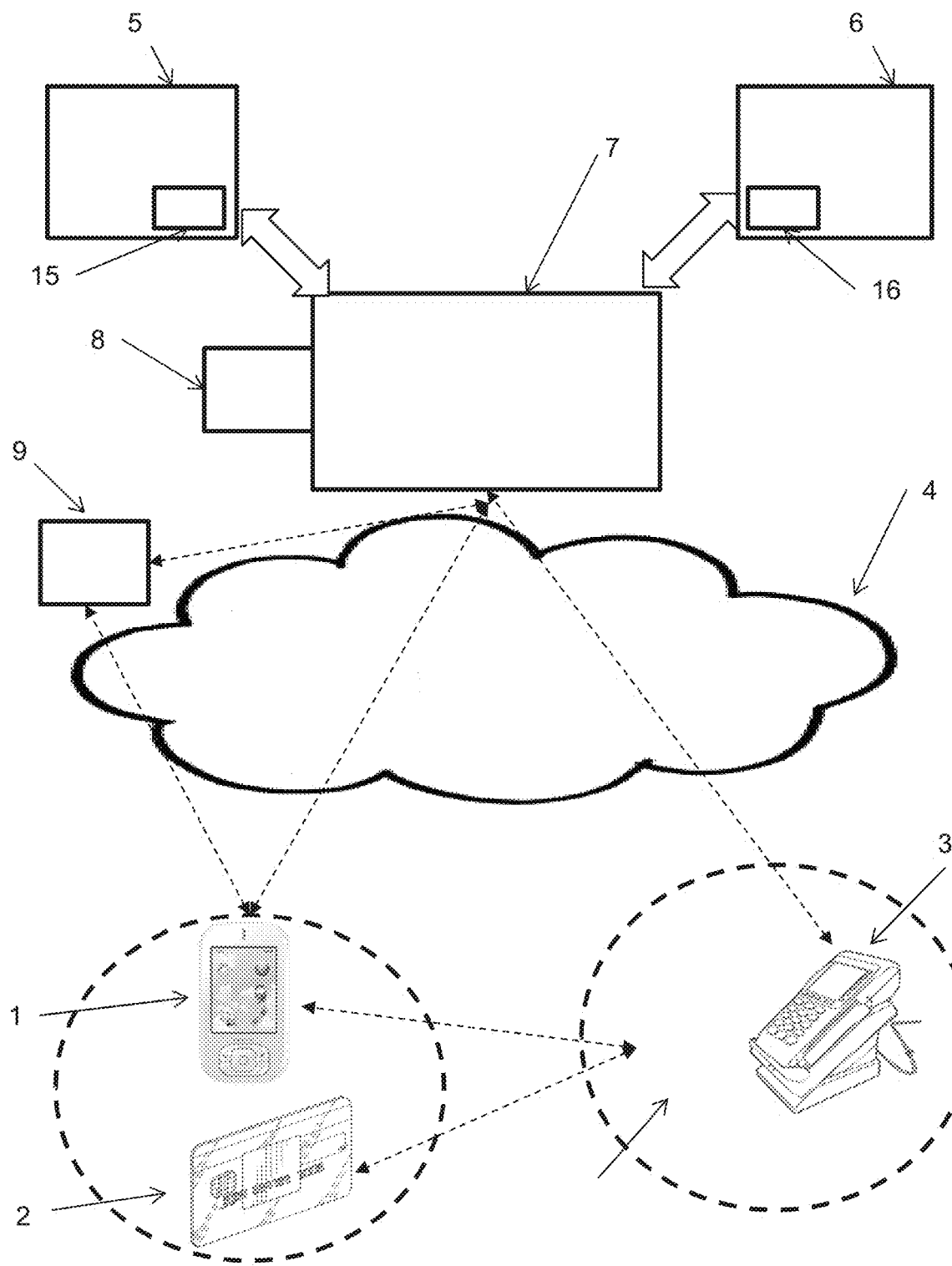
FIG. 1 shows elements of a conventional transaction system suitable for carrying out embodiments of the disclosure.

FIG. 1 shows schematically relevant parts of a representative transaction system, described briefly above, suitable for implementing an embodiment of the disclosure.

To perform a transaction, a customer interacts with a merchant. A payment card 2 or other payment device such as a mobile phone 1 of the customer interacts with a point of sale terminal 3 of the retailer to perform a transaction. A mobile phone 1 or other computing device, including but not limited to any NFC enabled payment device, may be used as a proxy for a physical payment card, or may act as a virtual card associated with a customer account with a card issuer 5. While a transaction between a payment device and a terminal 3 is shown here, other possibilities exist, such as a transaction between a computing device with a real or virtual card number and an internet-based merchant 9.

The terminal 3 and in some cases (such as a transaction with an internet-based retailer) the payment device interacts with the transaction infrastructure 7 and directly or (as shown here) indirectly with a card issuer 5 for the customer and an acquiring bank 6 for the merchant over a suitable network 4. The network 4 here represents any appropriate communication network or combination of networks for the communication path indicated, and may be the public interne, a cellular communications network or a private network, depending on the parties involved in the communication and the need for the communication path to be secure.

Value is transferred between the customer's bank (the issuing bank or issuer 5) and the merchant's bank (the acquiring bank or acquirer 6). The transaction is passed to the acquirer 6 and the issuer 5 through a transaction infrastructure 7, this achieves the necessary switching to direct transaction information appropriately, and is also associated with one or more data centers 8 controlling and monitoring the transaction process on behalf of the transaction infrastructure provider. The transaction is authorized by the issuer 5, typically according to a process established by the transaction infrastructure provider to allow authorization rules to be established and implemented by the issuer 5.

The payment device may operate under a contact or contactless protocol for communication with a point of interaction (POI) terminal such as a point of sale (POS) terminal or an automated teller machine (ATM). If used as a contactless device, the payment device includes a chip and a wireless transmitter and receiver adapted for short range communication by protocols such as those defined under ISO/IEC 14443.

The transaction infrastructure 7 connects the terminal 3, the card issuer 5, and the acquiring bank 6. This transaction infrastructure will typically be provided by a transaction infrastructure provider who provides services to the card issuing bank 5 to allow use of transaction cards associated with that transaction infrastructure. The transaction infrastructure 7 enables the issuer to provide authorization at the time of purchase, and provides clearing of the transaction and reconciliation typically within the same working day, and settlement of payments shortly after that. The transaction infrastructure 7 includes a plurality of switches, servers and databases, and most features of this infrastructure are not described further here where these are not necessary for understanding how embodiments of the disclosure function and may be implemented. A transaction infrastructure server 8 is however shown as associated with the transaction infrastructure and responsible for management and monitoring of the transaction infrastructure. The card issuer 5 has an issuer server 15 for interactions with the transaction system and the acquiring bank has an acquirer server 16 for such interactions as well.

Figure 2:
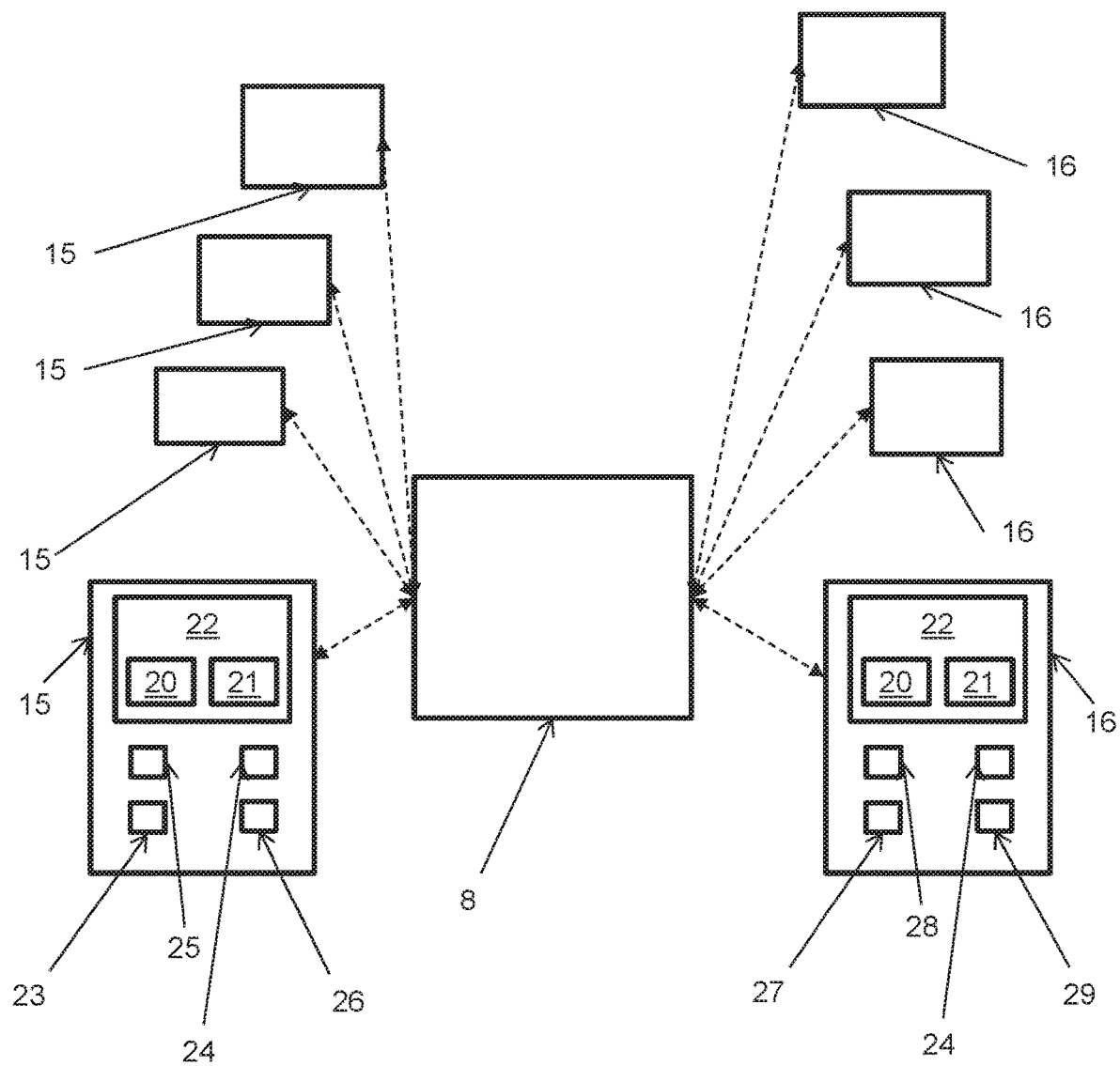
FIG. 2 shows a transaction system in which a transaction infrastructure interacts with multiple payment device issuers and acquiring banks.

The relationship between the transaction infrastructure 7 and issuing and acquiring banks 5, 6 is shown in more detail in FIG. 2. There are a large number of issuing banks and acquiring banks (many banks will perform both functions, but for convenience of illustration these functions are shown as split in FIG. 2), here represented by issuer servers 15 and acquirer servers 16, these are shown as interacting with the transaction infrastructure server 8. While these elements are each shown as individual servers, an issuer, an acquirer, or the transaction infrastructure 7 may be represented by a more complex computing system, for example with a plurality of servers, a plurality of memories or storage systems, and in some cases with particular functionality delegated to third parties. Typically, each will involve a computing estate situated in a data center. For a bank that functions as both a card issuer and a transaction acquirer, the functionality of issuer server 15 and acquirer server 16 may be provided by the same computing system.

Each of these servers includes one or more processors 20 and memories 21 defining a computing environment 22 in which software runs to achieved required functionality. In the case of the card issuer, the issuer server 15 operates at least to provide transaction authorization 23, clearing and settlement 24, and an issuer system interface 25, and may also provide a customer interface 26. In the case of the acquirer, the acquirer server 16 operates for transaction mediation 27 for merchants, for clearing and settlement 24, and an acquirer system interface 28, and may also provide a merchant interface 29.

An embodiment of the disclosure will now be described with reference to FIGS. 3 to 6 that relates to the transaction authorization 23 and issuer system interface 25, systems of the issuer and their interaction with the transaction infrastructure server 8. In this embodiment, the transaction infrastructure server 8 includes a master node 51 that interacts with agent manager nodes 41 disposed at each issuer server 15. As will be described below, the master node 51 provides some control of the operation of the agent nodes and receives reports from the agent nodes on the performance of the issuer server, whereas the agent manager nodes 41 determine local provisioning of processing nodes 42 and provide local control according to rules set from the master node 31. The processing nodes 42 implement transaction authorization for the issuer.

Figure 3:
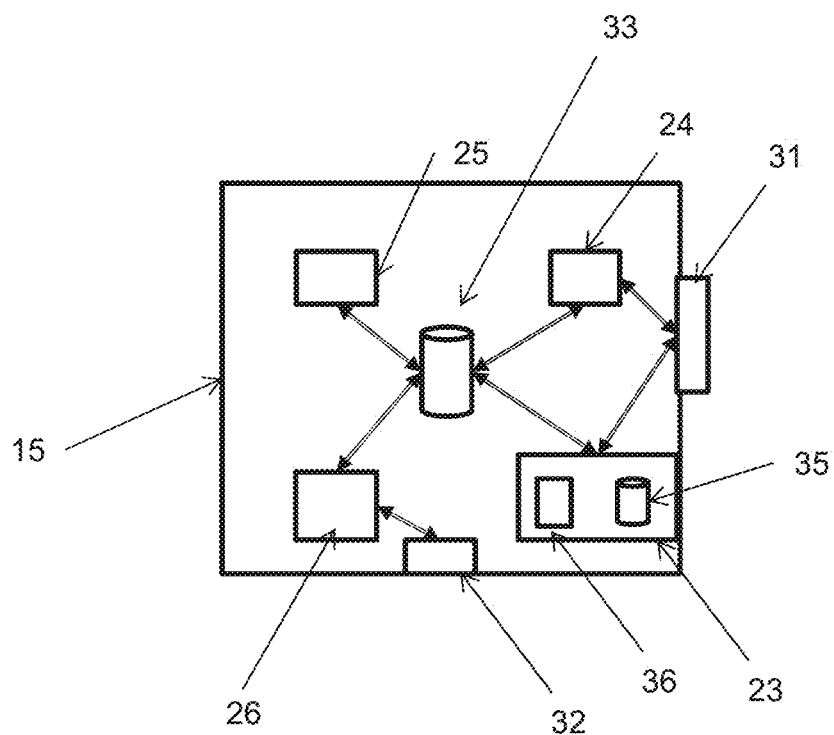
FIG. 3 shows an issuer server according to an embodiment of the disclosure.

FIG. 3 illustrates functional elements of the issuer server, or issuer server system. As noted above, the issuer server 15 provides transaction authorization 23, clearing and settlement 24, and an issuer system interface 25, and in this case also provides a customer interface 26. The transaction authorization 23 and clearing and settlement 24 systems interact with the transaction infrastructure through a transaction infrastructure communication port 31 (this may be termed communication "on the wire" below) and communicates with customers through a public internet gateway 32. Customer details (such as identity, credentials and transaction history) are shown as stored in a customer account database 33 that will be accessed by the different systems as needed. The transaction authorization system 23 holds authorization rules 35 and includes authorization processing 36 for transactions arriving on the wire using the authorization rules 35 and the customer account database 33.

Figure 4:
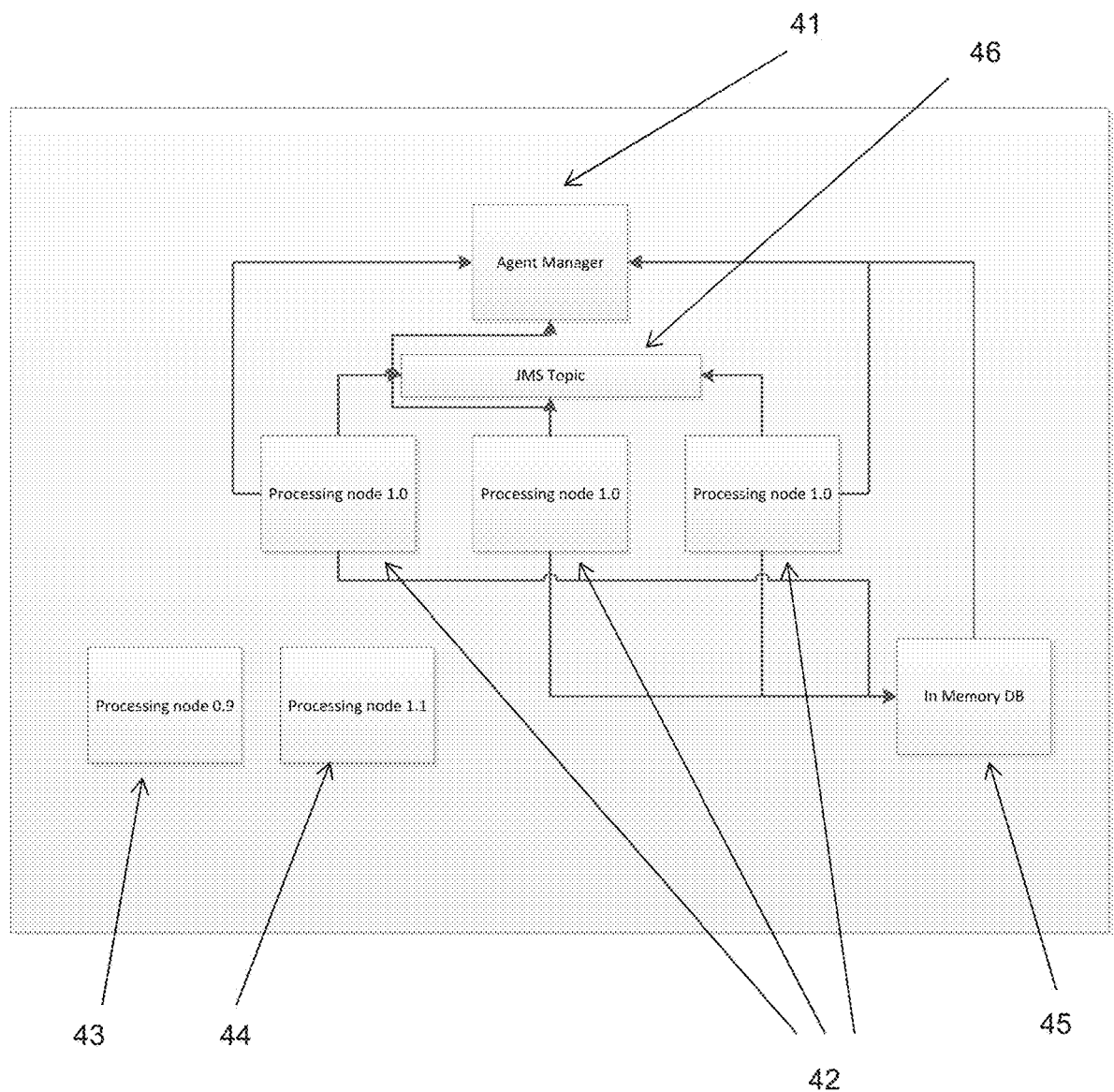
FIG. 4 shows interaction between functional elements in an issuer authorization system according to an embodiment of the disclosure.

Implementation of the processes in the transaction authorization system 23 (also termed issuer authorization system) according to an embodiment of the disclosure will now be described with reference to FIG. 4.

The agent manager 41 controls operation of authorization processes and interacts with the master node in the transaction infrastructure server. The agent manager 41 also installs and uninstalls processing nodes 42 to carry out authorization processes for transactions incoming on the wire. A used but now uninstalled processing node 43 and a processing node for future use 44 are shown, but are not currently active. The processing nodes 42 and the agent manager 41 interact with an in-memory database 45, and use a Java Messaging Service (JMS) topic element 46 for communication between the multiple elements involved, other forms of middleware messaging may be used, but the general use of Java Messaging Service makes JMS topic a practical choice.

Figure 5:
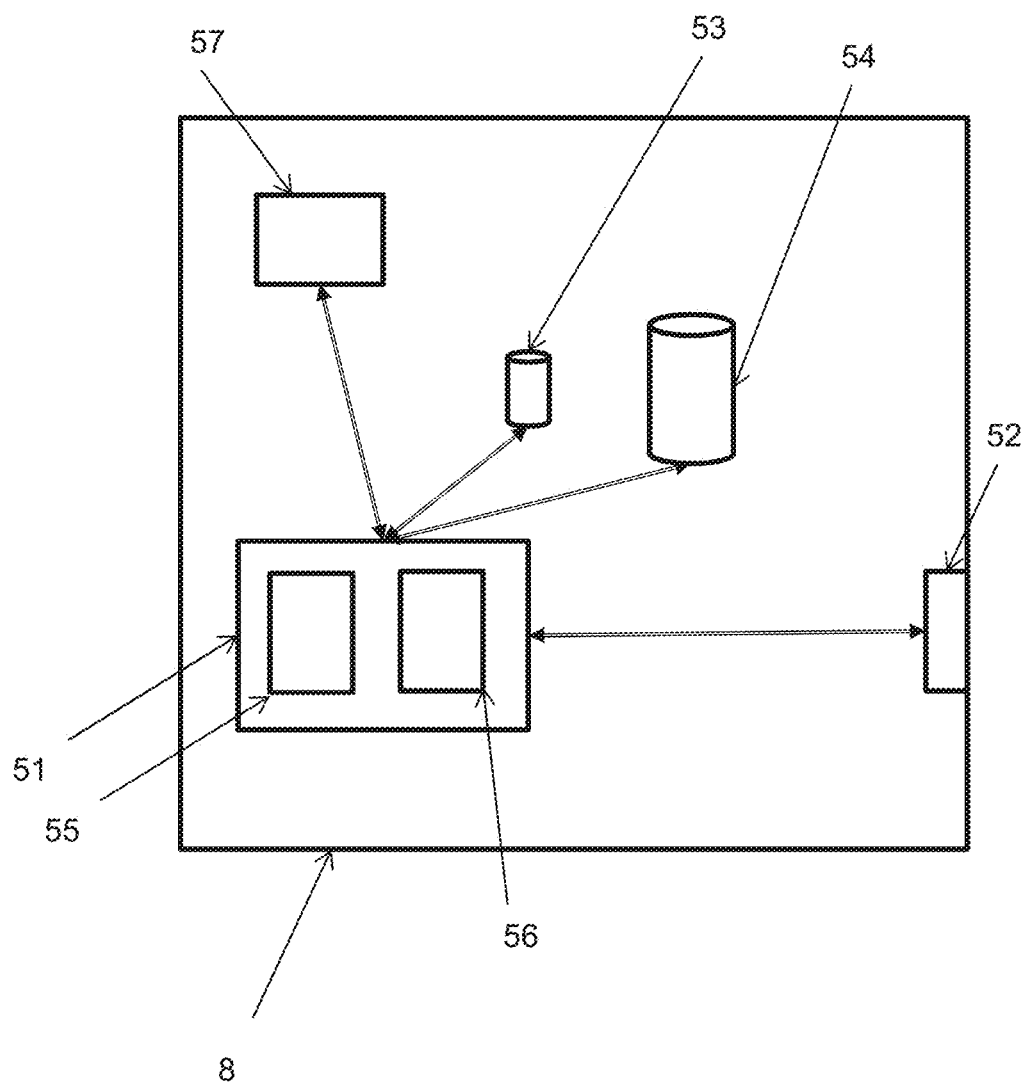
FIG. 5 shows a transaction infrastructure system server according to an embodiment of the disclosure.
Figure 6:
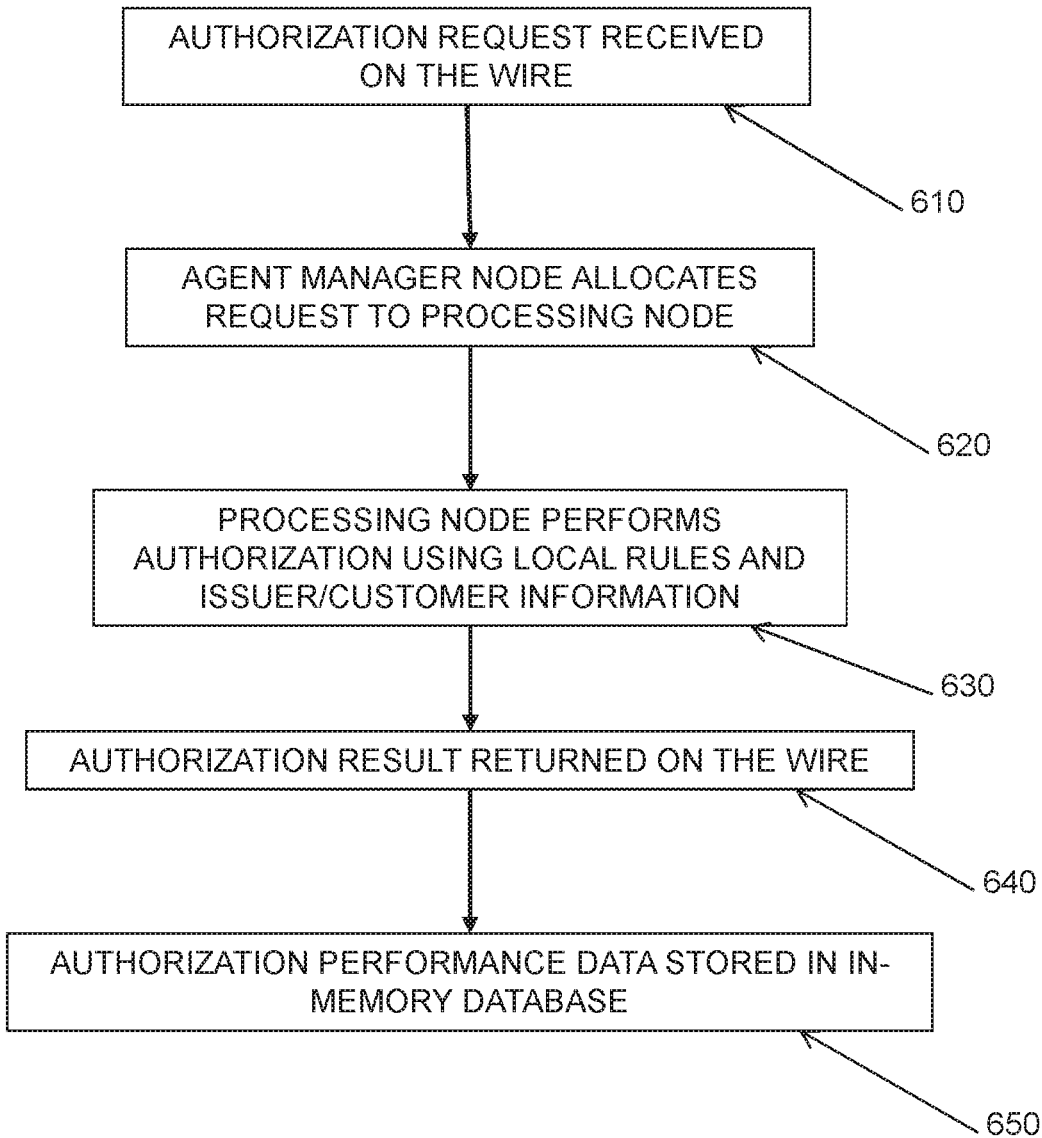
FIG. 6 shows an authorization control process according to an embodiment of the disclosure.

FIG. 5 shows elements of the transaction infrastructure server that support and interact with the authorization processes in the issuer servers according to embodiments of the disclosure. The master node 51 interacts with issuer servers through an appropriate port (indicated as issuer communication port 52) and is in communication with a rules database 53 and a master node in-memory database 54. The master node 51 can be considered to include a monitoring process 55 and a control process 56. The master node 51 interacts with a master node user interface 57 allowing control operations and reporting.

The functionality of different processes identified above will now be discussed in more detail in the context of implementation of embodiments of the disclosure.

As previously noted, the master node 51 maintains control over each agent manager node 41. The master node 51 has the ability to override certain agent controls. These can include direction of traffic to installed processing nodes 42, installing/uninstalling new processing nodes, and spawning new threads to increase processing capacity. This spawning of new threads may add new subscribers to the JMS topic which contains the queue of incoming requests dynamically up to the limit of available memory or to predefined limits set by the master node and maintained by the agent manager. These interventions by the master nodes would typically be "emergency" actions for malfunctioning (conceivably even subverted) agent nodes.

Agent manager nodes 41 communicate periodically with the master node 51 to provide updates on traffic statistics and on the number of running processing nodes using an appropriate communication protocol. Agent manager nodes 41 maintain status on various processes: JMS topic, load balancing, install of new nodes, and uninstall of old nodes as new nodes are installed and traffic is redirected. Critical data for the agent manager nodes 41 may be backed up to the master node 51 as a part of this communication process.

The agent manager node 41 has control over the existence of processing nodes. The agent manager node may spawn new nodes as required by transaction volume loads or transaction velocity, and then will uninstall them as the load and/or transaction velocity drops and processing nodes process below a threshold level of transactions or fall idle.

At the agent manager node 41, data required for system management and reporting is persisted to a local instance of an in-memory database 45. This allows rapid input and output for the agent manager node 41 and the associated processing nodes 42. This in-memory database 45 is backed up to the master node in-memory database 54 using an appropriate communications protocol. This approach, local in-memory instances backed up to a master node, can be realized using existing proprietary products such as Oracle Coherence. The master node in-memory database 54 can then be used for backing up local in-memory databases 45, but also for monitoring and reporting actions at the master node 51. In monitoring, the master node can use data from the master node in-memory database 54 to determine whether management actions need to be taken, such as overriding a local agent manager node 41 to take an action such as spawning a new processing node 42. In reporting, the master node 51 can use data from the master node in-memory database 54 to provide management reports on the performance of system elements (for example, on the performance of the authorization system of that issuer over time, or the relative performance of the that issuer in authorization functions when compared to other issuers).

As noted, an appropriate protocol may be used to push data from the agent manager node in-memory database 45 to the master node in-memory database 54. This may use an appropriate encryption protocol to protect the data, for example, mutual SSL could be used with the master node 51 taking responsibility for certificate management. The status of agent node certificates can then be displayed at the master node 51 as part of the monitoring process.

Using this approach, rules for authorization processes can be managed centrally through the master node 51. The currently valid rules are those held in the rules database 53, and any updates to these rules are made through the user interface 57 to the master node 51. A local copy of the currently active rules is held for use by the processing nodes 42 at the local in-memory database 45. A part of the monitoring process is to check whether the version of the rules held at the local in-memory database 45 matches that in the rules database 53, if not, an update to the correct version is installed from the master node 51.

The functions performed by processing nodes 42 and managed by agent manager nodes 41 will now be described in more detail. There are two main functions associated with the authorization process: rule implementation and authorization processing. Rules are mandated centrally and need to be implemented by each issuer. APIs are provided to allow the issuer to take certain actions that are not mandated by rules.

Processing node APIs may be provided as standard, or may be customized for the issuer. Such APIs are typically used for issuer interaction and for setup, rather than to establish the parameters of the authorization process, which will generally be determined by rules. Exemplary APIs are the following:

generateVCN—this enables a virtual card number (VCN) to be generated for a real, or physical, card number (RCN).

expireVCN—this involves updating the in-memory database 45 with indication of expiry of the VCN.

cancelVCN—this involves cancelling the VCN, typically in the event of fraud or theft.

modifyVCN—this may involve changing a specific VCN parameter, typically changing the length of validity or monetary limit for a VCN.

modifyRCN—this is similar to the equivalent VCN action, but typically involves changing expiry date or CVC information.

expireRCN—as for the equivalent VCN action.

cancelRCN—as for the equivalent VCN action.

Rule management will now be described in more detail. It should be noted that the rules themselves are essentially as implemented in conventional authorization processes carried out by card issuing banks. Rule validation is managed by the processing node 42 which validates any authorization request against the local copy of the rules installed in the in-memory database 45. As noted, the rules for the transaction infrastructure 7 are imposed centrally and implemented by the issuer, either at the issuer's site or on an "on-behalf of" basis by the provider of the transaction infrastructure 7. These may be supplemented by rules local to the issuer, these could be used by processing nodes 42 in an authorization process in addition to payment device and customer data, such additional information could be provided by the issuer through issuer APIs as described previously.

Rules may, without restriction, relate to the following criteria, all of which can be applied by a processing node 42 in an authorization process generally by checking details of the transaction against data held at the issuer for the transaction device (or a specific card number associated with it) in customer account database 33:

Single use—a card number may be restricted to a single use, and further requests will therefore not be authorized.

Multi use—a multiple use card number should be tracked to ensure it is not used outside its use restrictions.

Single merchant—a card number may be limited to use with a single merchant, so this will need to be checked in the authorization process.

MCC checking—merchant category code (MCC) may be used as a restriction on cards, so MCC needs to be checked as a part of the authorization process.

Geographic region—certain card numbers may be approved for use only in a specific geographic region.

The steps of an authorization process performed at the issuer using an embodiment as described above are set out in FIG. 6. Firstly, an authorization request is received 610 on the wire from the transaction infrastructure 7. The request is received by the agent manager node 41 and allocated 620 to a processing node 42. Alternative arrangements are possible that allocate incoming authorization requests directly without the agent manager node 41 acting as an intermediary. The processing node 42 then performs 630 the authorization process according to the local copy of the rules in the in-line memory 45 and the customer data (and any issuer specific processes) in customer account database 33.

When the processing node 42 has performed the authorization process and reached an authorization result, this authorization result is then returned 640 on the wire to the transaction infrastructure so that the transaction can be completed or declined accordingly. Results of the authorization process are then stored 650 in the in-line database 45 for use in reporting to the master node 51 in due course.

As noted above, the processing nodes 42 perform on the wire authorization of transactions together with issuer API actions (typically VCN/RCN requests). Authorization traffic for live transactions is time critical, whereas API actions typically are not, authorization traffic will typically have priority as a result, with the agent manager node 41 maintaining control over flow and distribution of the requests and responses received over the wire, managing priorities and meeting service level requirements accordingly.

The approach to management of authorization processes described above can be used for other processes carried out by issuing banks and acquiring banks in connection with the transaction infrastructure. For example, this approach can be used in managing and administering clearing and settlement batch processing by issuers and acquirers. These processes are not generally time critical, or if time critical, on a timescale of days rather than seconds, so scheduling by the agent manager node is a less significant issue.

While specific embodiments of the disclosure are described in detail above, the skilled person will appreciate that alternative embodiments may readily be devised that still fall within the scope of the claims. The scope of the disclosure is defined by the spirit and scope of the claims and is not limited by the embodiments described here.

The invention claimed is:

1. A computing apparatus configured to authorize transactions initiated using payment devices issued by an issuer of the payment devices, the computing apparatus comprising a programmed processor configured to provide the following:

an agent manager node executing on an issuer server of the issuer, wherein the agent manager node spawns, installs, and uninstalls one or more transaction processing nodes on the issuer server based upon at least one of transaction processing volume and transaction processing velocity, wherein each of the one or more transaction processing nodes stores currently active transaction authorization rules in a local-in-memory database, wherein the one or more transaction processing nodes provide a payment device API for the issuer, and wherein the payment device API provides issuer interaction with the agent manager node that is separate from authorization rule establishment;

a master node executing on a transaction infrastructure server of a transaction processing infrastructure, wherein the master node interacts with the agent manager node via an issuer communication port on the transaction infrastructure server, wherein the master node stores valid transaction authorization rules in a transaction authorization rules database, wherein the valid transaction authorization rules are established by a transaction infrastructure provider, wherein the master node (i) determines whether the stored valid transaction authorization rules and the currently active transaction authorization rules of the each of the one or more transaction processing nodes match, and (ii) in response to determining that the currently active transaction authorization rules of at least one of the one or more transaction processing nodes do not match, updates the currently active transaction authorization rules of the at least one of the one or more non-matching transaction processing nodes with the stored valid transaction authorization rules; and an interface to the transaction processing infrastructure that receives, by the issuer server via an infrastructure communication port of the issuer server, transaction data associated with a current transaction for a transaction authorization processing operation, wherein the agent manager node allocates the transaction data to one of the one or more transaction processing nodes, wherein the one of the one or more transaction processing nodes locally performs the transaction authorization processing operation on the transaction data using (i) the updated currently active transaction authorization rules under control of the agent manager node and (ii) at least one of payment device data and customer data provided by the issuer through the payment device API, wherein the transaction authorization processing operation includes authorizing the current transaction associated with the transaction data, and wherein authorizing the current transaction completes the transaction authorization processing operations.

2. The computing apparatus of claim 1, further comprising an in-memory database containing the transaction data from and for the one or more transaction processing nodes.

3. The computing apparatus claimed in claim 1, wherein the master node is physically separate from the computing apparatus.

4. The computing apparatus claimed in claim 1, wherein the agent manager node receives control information from the master node.

5. The computing apparatus claimed in claim 1, wherein the computing apparatus acts for a payment device issuing bank.

6. The computing apparatus of claim 1, wherein the master node spawns the one or more transaction processing nodes to dynamically process the transaction data up to at least one of a memory of the one or more transaction processing nodes and a predefined limit defined by the stored valid transaction authorization rules.

7. A transaction infrastructure computing apparatus configured to provide control of a system for authorizing transactions initiated using payment devices issued by an issuer of the payment devices at one or more remote computing apparatus locations, the transaction infrastructure computing apparatus comprising a programmed processor configured to provide the following:

a master node executing on a transaction infrastructure server, wherein the master node interacts, via an issuer communication port on the transaction infrastructure server, with one or more agent manager nodes executing on an issuer server of the issuer at a remote computing apparatus location, wherein each of the one or more agent manager nodes controls transaction processing operations at the remote computing apparatus location, wherein the master node provides control information to the one or more agent manager nodes, wherein the one or more agent manager nodes spawn, install, and uninstall transaction processing nodes based upon at least one of transaction processing volume and transaction processing velocity, wherein each of the transaction processing nodes stores currently active transaction authorization rules in a local-in-memory database, wherein the transaction processing nodes provide a payment device API for the issuer, wherein the payment device API provides issuer interaction with the one or more agent manager nodes that is separate from authorization rule establishment, wherein the master node stores valid transaction authorization rules in a transaction authorization rules database, wherein the valid transaction authorization rules are established by a transaction infrastructure provider, wherein the master node (i) determines whether the stored valid transaction authorization rules and the currently active authorization rules of each of the transaction processing nodes match, and (ii) in response to determining that the currently active transaction authorization rules of at least one of the transaction processing nodes does not match, updates the currently active transaction authorization rules of the at least one of the non-matching transaction processing nodes with the stored valid transaction authorization rules; and a network connection that communicates, via an infrastructure communication port of the issuer server, with the remote computing apparatus location, wherein the issuer server receives transaction data associated with current transactions for the transaction authorization processing operations, wherein one of the one or more agent manager nodes allocates the transaction data to the transaction processing nodes, wherein the transactions are authorized locally by the issuer using (i) the updated currently active transaction authorization rules under control of the one of the one or more agent manager nodes and (ii) at least one of payment device data and customer data provided by the issuer through the payment device API, and wherein the authorizing, by the issuer, the transactions by the transaction processing nodes completes the transaction authorization processing operations.

8. The transaction infrastructure computing apparatus of claim 7, further comprising a master in-memory database on the master node, wherein the master in-memory database backs up the local in-memory database.

9. A method of authorizing transactions initiated using payment devices issued by an issuer of the payment devices at a computing apparatus, the method comprising:

spawning, installing, and uninstalling, by an agent manager node executing on an issuer server of the issuer, one or more transaction processing nodes on the issuer server based upon at least one of transaction processing volume and transaction processing velocity, wherein each of the one or more transaction processing nodes stores currently active transaction authorization rules in a local-in-memory database, wherein the one or more transaction processing nodes provide a payment device API for the issuer, and wherein the payment device API provides issuer interaction with the agent manager node that is separate from authorization rule establishment;

receiving, via an issuer communication port on a transaction infrastructure server at the one or more transaction processing nodes, from a master node executing on a transaction infrastructure server of a transaction processing infrastructure, updated currently active transaction authorization rules comprising valid transaction authorization rules stored by the master node, wherein the valid transaction authorization rules are established by a transaction infrastructure provider, and wherein the receiving of the updated transaction authorization rules responds to a determination by the master node that the stored currently active transaction authorization rules at the one or more transaction processing nodes do not match the valid transaction authorization rules;

receiving, by an issuer server via an infrastructure communication port of the issuer server, transaction data associated with a current transaction from the transaction processing infrastructure for a transaction authorization processing operation;

allocating, by the agent manager node, the transaction data to one of the one or more transaction processing nodes;

performing, locally by the one of the one or more transaction processing nodes, the transaction authorization processing operation on the transaction data using (i) the updated currently active transaction authorization rules under control of the agent manager node and (ii) at least one of payment device data and customer data provided by the issuer through the payment device API, wherein the transaction operation includes authorizing the current transaction associated with the transaction data, and wherein authorizing the current transaction completes the transaction authorization processing operation.

10. The method of claim 9, wherein the master node is remote from the computing apparatus and wherein transaction operation performance data is provided to the master node.

11. The method of claim 10, wherein the computing apparatus acts for a payment device issuing bank.

12. The computing apparatus of claim 9, wherein the local in-memory database is backed up to a master in-memory database local to the master node.

13. The computing apparatus of claim 9, wherein the valid transaction authorization rules are stored in a master database local to the master node.

* * * * *